(No Model.) 3 Sheets—Sheet 1.

J. F. HODGEN.
BAND CUTTER AND FEEDER.

No. 601,962. Patented Apr. 5, 1898.

Witnesses
Jno. Ennis
C. E. Hines

Inventor
Joe F. Hodgen
by R. S. & A. B. Lacey
His Attorneys (No Model.) 3 Sheets—Sheet 3.

J. F. HODGEN.
BAND CUTTER AND FEEDER.

No. 601,962. Patented Apr. 5, 1898.

Witnesses
Inventor
Joe F. Hodgen
by R. S. & A. B. Lacey
his Attorneys

UNITED STATES PATENT OFFICE.

JOSEPH F. HODGEN, OF SCANDIA, KANSAS.

BAND-CUTTER AND FEEDER.

SPECIFICATION forming part of Letters Patent No. 601,962, dated April 5, 1898.

Application filed August 5, 1897. Serial No. 647,223. (No model.)

*To all whom it may concern:*

Be it known that I, JOSEPH F. HODGEN, a citizen of the United States, residing at Scandia, in the county of Republic and State of Kansas, have invented certain new and useful Improvements in Band-Cutters and Feeders; and I do hereby declare the following to be a full, clear, and exact description of the invention, such as will enable others skilled in the art to which it appertains to make and use the same.

My invention relates to improvements in band-cutters and feeders for threshing-machines; and its object is to provide novel and effective mechanism for cutting the band of the bundle, spreading the grain, and feeding the grain in spread condition to the beating-cylinder.

To the accomplishment of this end the invention consists in the novel constructions and combinations of parts hereinafter more fully described, and particularly pointed out in the claim.

Figure 1:
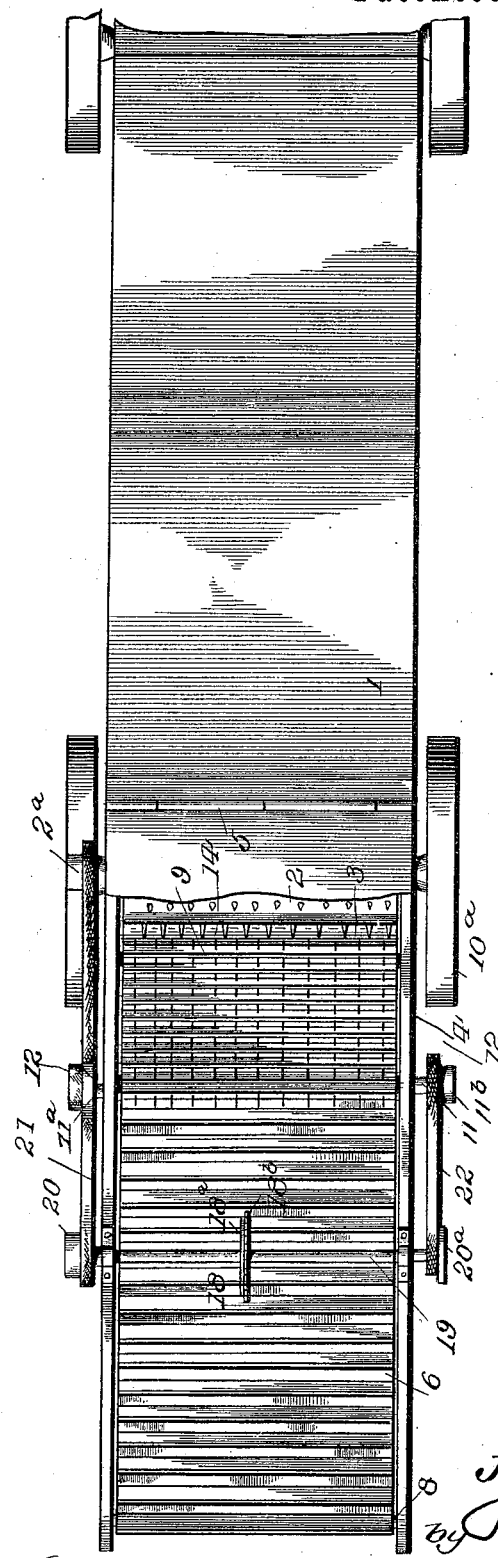
Figure 2:
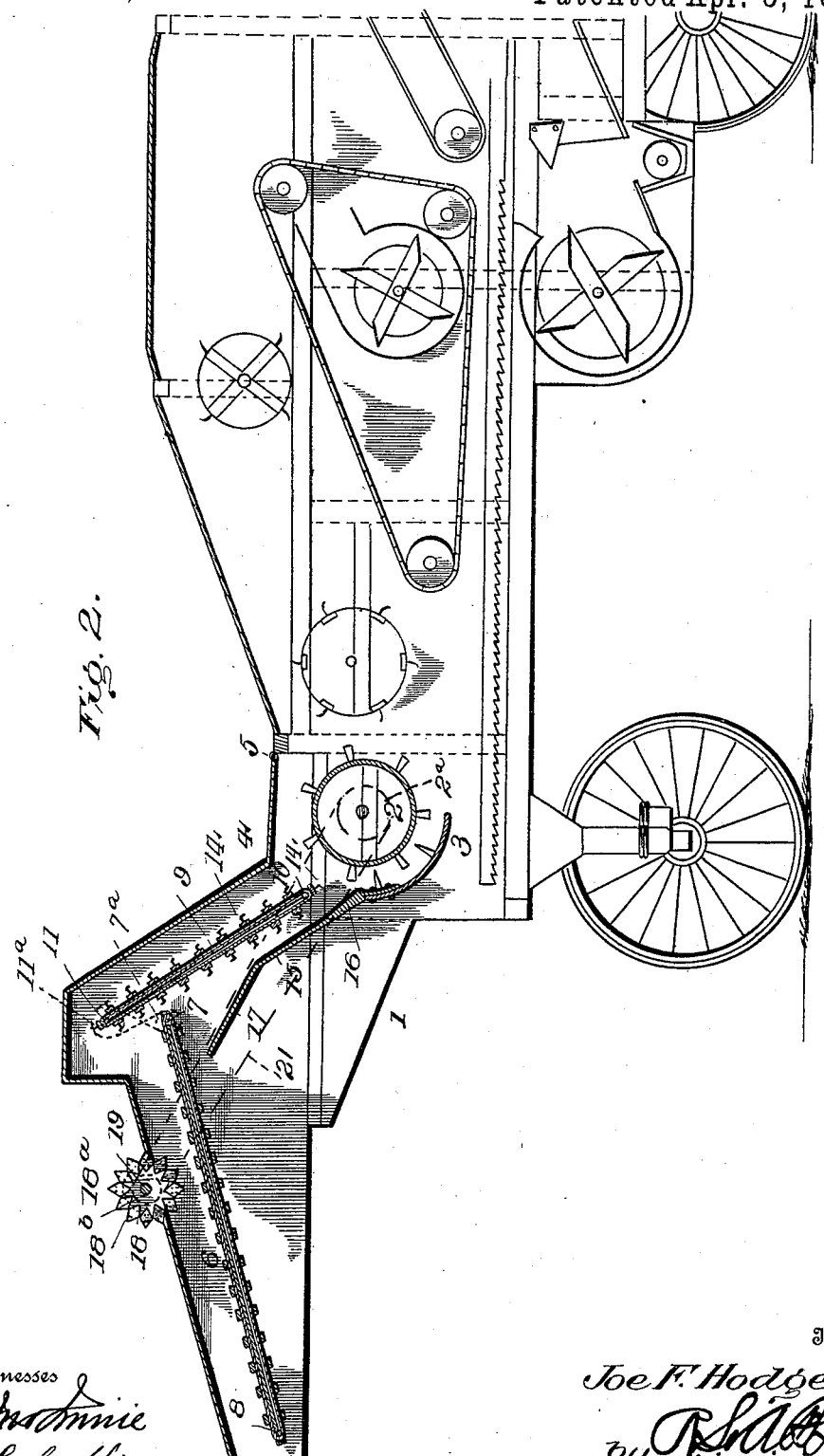
Figure 3:
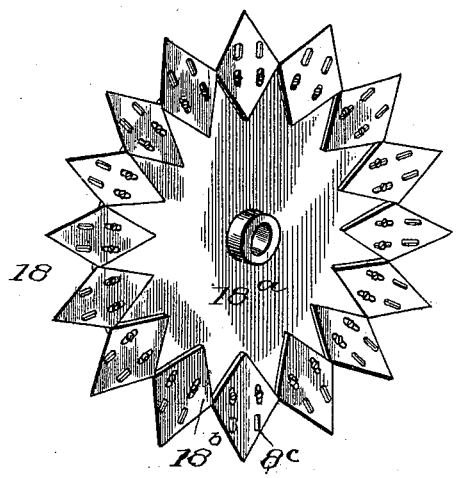
Figure 4:
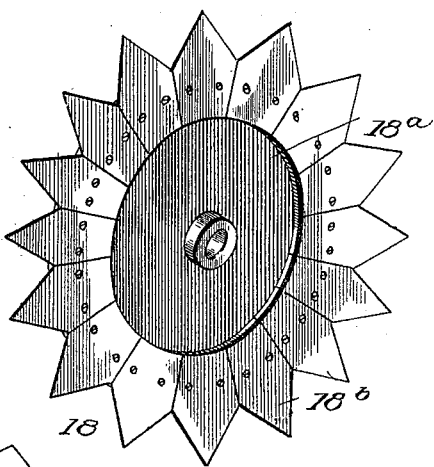
Figure 5:
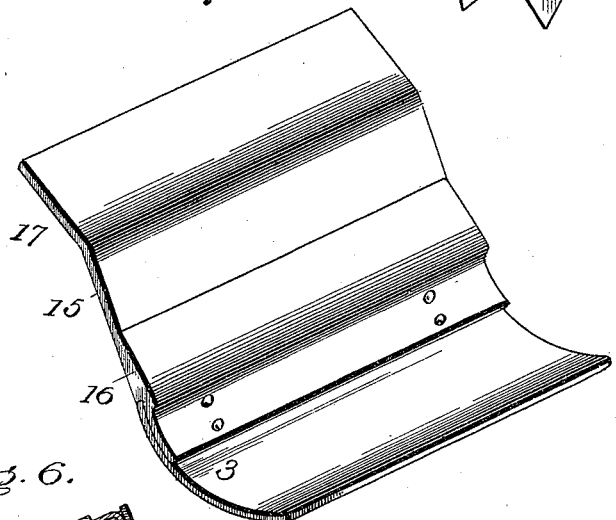
Figure 6:
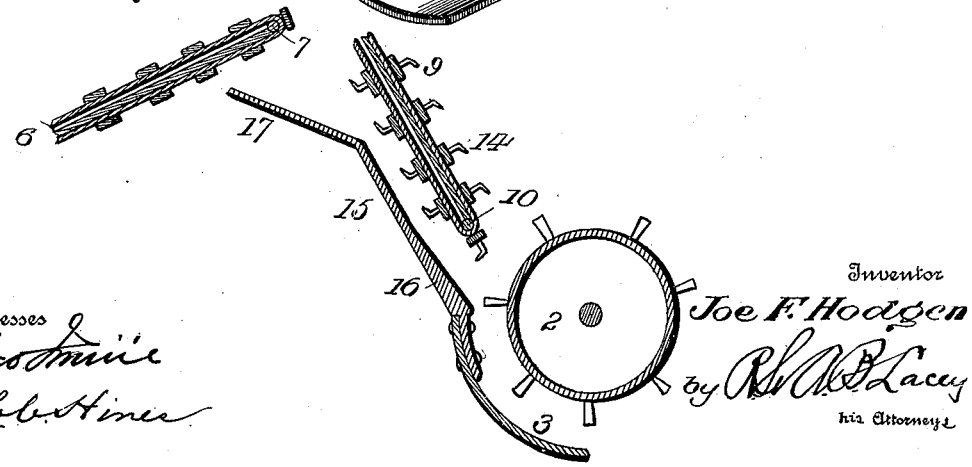

In the drawings herewith, forming part of this specification, Figure 1 is a top plan view of a threshing-machine embodying my invention; Fig. 2, a longitudinal sectional view of the same. Fig. 3 is a detail perspective view of the band-cutter. Fig. 4 is a modification of the same. Fig. 5 is a detail perspective view of the guide-board and concave, and Fig. 6 a broken detail sectional view of the grain feeding and beating mechanism.

Referring now more particularly to the accompanying drawings, 1 represents the frame of a threshing-machine of approved construction, and 2 the beating cylinder or drum operating in the concave-breasting 3.

4 represents the frame of the band-cutting and feeding mechanism, which is secured at one end by hinges 5 to the frame of the thresher to enable it to be raised and laid over upon the separator when it is desired to have access to the cylinder for the purpose of removing or cleaning the same.

The grain-bundle is fed to the cylinder by the upwardly-inclined carrier 6, which passes around the upper and lower shafts 7 8, journaled in the frame 4, said shaft 7 being provided at one end with a stepped pulley $7^a$. The carrier-rake 9 extends approximately at right angles to the carrier 6 in line between the lowermost portion of the cylinder and the breasting 3 and passes around the shafts 10 11, which are also journaled in the frame 4. The shaft 11 is provided with a pulley $11^a$ of the same size as the pulley $7^a$, and a crossed band or belt 12 passes over said pulleys. The carrier-rake is provided with the curved rake teeth or fingers 14, which serve to spread the grain after the band is severed and feed the same to the cylinder 2.

In accordance with my invention I provide the concave-breasting 3 with a guide-board 15, extending parallel with the carrier-rake 9 and formed at its lower end with a thickened deflecting portion 16, adjacent the lower end of said carrier, to force the grain into engagement therewith and thereby insure a positive feed. The upper end of this guide-board is provided with an inclined extension 17, projecting toward the upper end of the carrier 6 and adapted to receive the grain therefrom and bring it into position to be acted on by the carrier-rake.

The band-cutter 18 is mounted upon a shaft 19, extending transversely above an opening in the frame 4 above the carrier 6, and comprises a disk $18^a$, provided with a series of diamond-shaped peripheral cutting-blades $18^b$, said blades being provided with two sets of slots $8^c$ for the passage of set-screws or fastening devices for securing said blade to the disk. The opposite side edges of the pointed end of each blade are beveled to form cutting edges, which sever the bands of the bundle when rotary motion is imparted to the cutter. In the modification shown in Fig. 4 the blades are rigidly connected at their heel ends to the disk and have their outer ends only provided with cutting edges. The shaft 19 is provided at one end with a single pulley 20, and a belt 21 passes over this pulley and over a pulley $2^a$ on the shaft of the cylinder 2 and drives said shaft 19. The shaft 19 is also provided with a stepped pulley $20^a$ at its opposite end and the shaft 11 at the contiguous end with a stepped pulley $11^b$, and a belt 22 passes over these pulleys and drives the shafts 7 11. By providing these stepped pulleys on the carrier and band-cutter shafts 7 11 19 the speed of the carriers may be varied relatively to feed the grain fast or slow, as circumstances require and according to the condition of the grain.

I desire it understood that I do not limit my invention to the specific construction and relation of parts herein shown and described, but reserve to myself the right to make such changes and modifications as fairly fall within the spirit and scope of my invention.

Having thus fully described my invention, what I claim as new and useful, and desire to secure by Letters Patent of the United States, is—

The combination with the main frame 1 of a threshing-machine, of a beating drum or cylinder 2 mounted therein, a covered frame or inclosing housing 4 hinged at its inner end to the feeding-in end of the main frame and adapted to be turned over upon the same, the concave-breasting 3, an upwardly-inclined carrier 6 mounted on shafts journaled in said frame, a carrier-rake 7 also mounted on shafts journaled in the frame 4 and extending at an angle to the bundle-carrier and on a line between the cylinder and breasting, a guide-board 15 fixed to the frame 4 and extending parallel with the lower end of the said carrier-rake, said guide-board having its lower end rigidly secured to the concave and provided with an integral thickened deflecting portion 16 contiguous to the same, and its upper end provided with an inclined extension 17 extending beneath the delivery end of the carrier 6, a rotary band-cutter also mounted in the frame 4 above said carrier 6, and means for operating the cylinder, carrier, carrier-rake and band-cutter, substantially as described.

In testimony whereof I affix my signature in presence of two witnesses.

JOSEPH F. HODGEN.

Witnesses:
WILL G. KING,
ED CHRISTIAN.